United States Patent [19]

Lautier et al.

[11] 4,186,348

[45] Jan. 29, 1980

[54] RECEIVER FOR DATA TRANSMITTED BY MEANS OF THE INTERLEAVED BINARY PHASE SHIFT KEYED MODULATION TECHNIQUE

[75] Inventors: Alex H. Lautier, Nice; Jean L. Monrolin, LaGaude, both of France

[73] Assignee: International Business Machines Corp., Armonk, N.Y.

[21] Appl. No.: 908,186

[22] Filed: May 22, 1978

[30] Foreign Application Priority Data

Jun. 10, 1977 [FR] France .................................. 77 18762

[51] Int. Cl.² ............................................... H04B 1/16
[52] U.S. Cl. ...................................... 325/320; 178/88
[58] Field of Search .................... 325/320; 178/67, 68, 178/88; 329/110, 112

[56] References Cited

U.S. PATENT DOCUMENTS

| | | | |
|---|---|---|---|
| 3,826,990 | 7/1974 | Pera | 178/88 |
| 3,835,404 | 9/1974 | Nakamura | 178/88 |
| 4,074,119 | 2/1978 | Steinert | 325/320 |
| 4,088,832 | 5/1978 | Eastmond | 178/88 |
| 4,100,499 | 7/1978 | Monrolin | 325/320 |

FOREIGN PATENT DOCUMENTS 2164175 7/1973 France .................................... 325/320

OTHER PUBLICATIONS

"A Modular Program for Simulation of Digital Systems and its Application to Satellite System Optimization" Herman et al. Conference on Digital Processing of Signals in Communications Loughborough, Apr. 11-13, 1972 pp. 1-16 IERE Publication.

*Primary Examiner*—Robert L. Griffin
*Assistant Examiner*—Michael A. Masinick
*Attorney, Agent, or Firm*—John B. Frisone

[57] ABSTRACT

A receiver for a data transmission system employing the interleaved binary phase shift keyed modulation technique. The received signal is demodulated by means of an in-phase reference carrier and a quadrature reference carrier both of which are supplied by a clock and carrier recovery device, thereby supplying the in-phase and quadrature components of the signal. The sign of the sum of these components and that of the difference between them are selectively gated to the output of the receiver under control of the clock signal supplied by the clock and carrier recovery device. In this device, the frequency of the received signal is doubled and the signal thus obtained is modulated by the clock signal at half the signaling rate extracted from the received signal. This modulation operation yields a signal at twice the carrier frequency from which the in-phase and quadrature reference carriers are extracted.

3 Claims, 3 Drawing Figures

RECEIVER FOR DATA TRANSMITTED BY MEANS OF THE INTERLEAVED BINARY PHASE SHIFT KEYED MODULATION TECHNIQUE

BACKGROUND OF THE INVENTION

This invention relates to data transmission systems and, more particularly, to a data receiver for a data transmission system employing the interleaved binary phase shift keyed modulation technique.

Interleaved binary phase shift keyed modulation is a particular form of the widely used binary phase shift keyed (BPSK) modulation technique which has been described in many publications. Reference may be made, for instance, to the book titled, *Information Transmission, Modulation and Noise,* by M. Schwartz, section 4-2, McGraw-Hill, New York, 1970, for a description of BPSK modulation, and to the books titled *Data Transmission,* by R. W. Bennett and J. R. Davey, chapter 10, McGraw-Hill, New York, 1965, and *Principles of Data Transmission,* by R. W. Lucky, J. Salz and E. J. Weldon, Jr., chapter 3, McGraw-Hill, New York, 1968, for a general description of the phase shift keyed modulation technique. Briefly, BPSK modulation is a technique wherein the bits to be transmitted are sent one at a time at instants which have a T-second spacing and are called signaling instants, by making each bit value correspond to one of two possible carrier phase changes relative to the carrier phase at the preceding signaling instant. The absolute carrier phase can assume, at each signaling instant, one of two possible values. By indicating the two possible values of the phase of the carrier in a so-called signal space diagram, a pair of points that are 180° apart in phase are obtained which illustrate the modulation scheme employed.

In the interleaved BPSK modulation technique, the bit to be transmitted is made to correspond, at an even signaling instant, to a selected one of a first pair of points that are 180° apart in phase in the diagram, this first pair of points illustrating a first modulation scheme, and, at an odd signaling instant, to a selected one of a second pair of points that are 180° apart in phase, this second pair of points illustrating a second modulation scheme, with the first and second pairs of points being 90° apart in phase. The only difference between BPSK modulation technique and interleaved BPSK modulation technique is that the latter uses alternatively two modulation schemes which are interleaved in time.

An advantage of interleaved BPSK modulation over BPSK modulation is that it provides a modulated signal, the envelope of which varies but little in time. Consequently, most of the energy remains concentrated in a well-defined, narrow frequency band in a nonlinear channel. Interleaved BPSK modulation has been advantageously used in satellite communication systems wherein signals are received and transmitted over several adjacent frequency bands through a single nonlinear transponder. Thus, it is essential to ensure that the method employed minimizes interferences between bands. However, there is an inherent disadvantage in this type of modulation. As has been mentioned above, interleaved BPSK modulation involves the use of two different pairs of points in the signal space diagram; and if the transmitted data are to be correctly detected, the receiver must know at any given signaling instant whether it is to use the first or the second pair of points as a detection reference. In other words, the receiver must be synchronized with the transmitter. In the early transmission systems that used interleaved BPSK modulation, a synchronization sequence was transmitted to enable detection before the data message. This was, of course, a time-consuming solution which required the use of additional equipment in both the transmitter and the receiver and of special resynchronization procedures in the event of loss of the phase of the signals that define the interleaving rate.

OBJECTS OF THE INVENTION

It is, therefore, one objection of this invention to provide a self-synchronized receiver of simple design for use in a data transmission system employing interleaved BPSK modulation.

Broadly, this and other objects are attained by providing a receiver in which the received signal is demodulated by means of an in-phase reference carrier and a quadrature reference carrier both of which are supplied by a clock and carrier recovery device, thereby supplying the in-phase and quadrature components of the signal. The sign of the sum of these components and that of the difference between them are selectively gated to the output of the receiver under control of the clock signal supplied by the clock and carrier recovery device. In this device, the frequency of the received signal is doubled and the signal thus obtained is modulated by the clock signal at half the signaling rate extracted from the received signal. This modulation operation yields a signal at twice the carrier frequency from which the in-phase and quadrature reference carriers are extracted.

The foregoing and other objects, features and advantages of the invention will be apparent from the following more particular description of a preferred embodiment of the invention as illustrated in the accompanying drawings.

DESCRIPTION OF THE PREFERRED EMBODIMENTS

Figure 1:
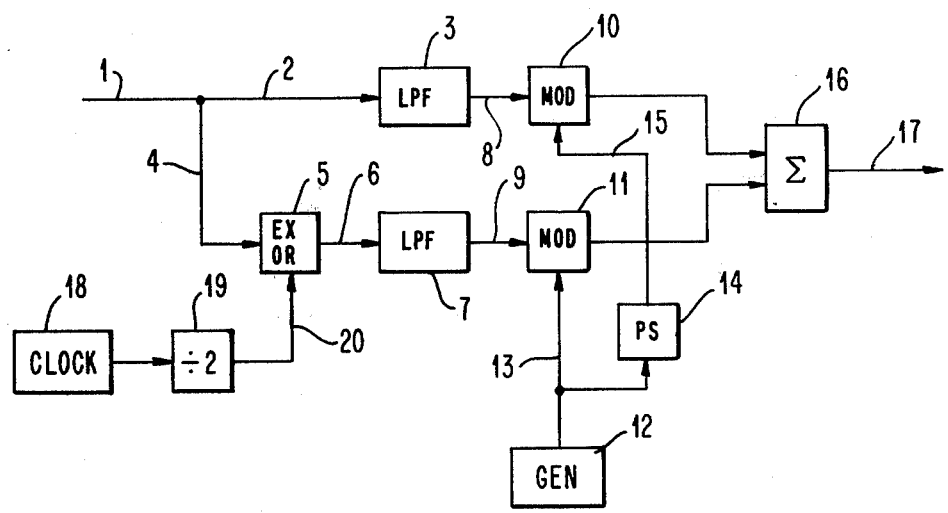
FIG. 1 is a block diagram of a transmitter for a transmission system using interleaved BPSK modulation.

In order to illustrate the context within which the invention is used, a simplified block diagram of a transmitter using the interleaved BPSK modulation technique has been shown in FIG. 1. The data bits to be transmitted are received on line 1 and fed via line 2 to the input of a lowpass filter 3 and via line 4 to an input of an Exclusive OR circuit 5, the output of which is applied via a line 6 to the input of a lowpass filter 7 which is identical to filter 3. The outputs from filters 3 and 7 are respectively applied via lines 8 and 9 to a first input of each of a pair of amplitude modulators 10 and 11. A carrier generator 12 supplies an "in-phase" carrier which is applied to the second input of modulator 11 via a line 13. The phase of the carrier is shifted 90° by a phase shifter 14 and applied as a "quadrature" carrier to the second input of modulator 10 via a line 15. The outputs from modulators 10 and 11 are summed by a summing device 16 which provides a modulated output via line 17 to the input of the transmission channel not shown. A clock generator 18 provides signals at the signaling rate 1/T to a divide by two circuit 19. The clock signals supplied at a rate of ½T by circuit 19 are fed to the other input of Exclusive OR circuit 5 via a line 20. It will be noted that the only difference between a conventional BPSK transmitter and the one shown in the block diagram of FIG. 1 is that the latter includes the Exclusive OR circuit 5 and the divide by two circuit 19 which control the interleaving of the two modulation schemes.

Figure 2:
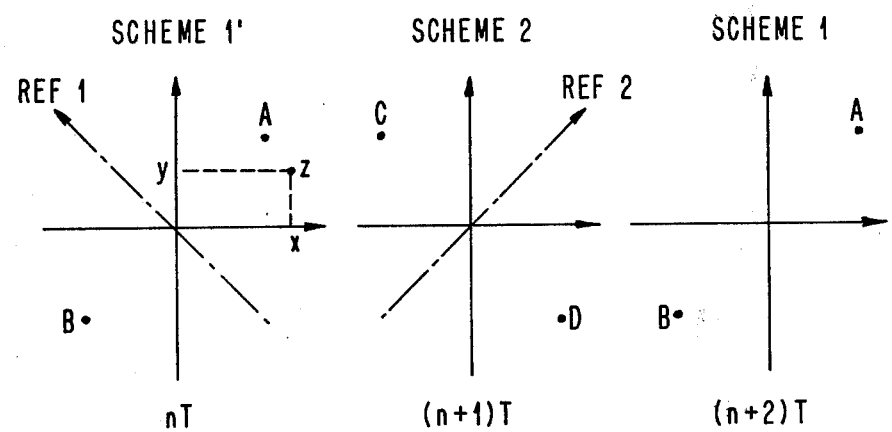
FIG. 2 includes signal space diagrams which illustrate the interleaved BPSK modulation technique.

Before describing the operation of the device of FIG. 1, the three signal space diagrams shown in FIG. 2 which illustrate the interleaved BPSK modulation technique will be discussed. The first or leftmost diagram in FIG. 2 shows the pair of points, A–B, representing the two phase values that the carrier can assume at signaling instant nT, T being the signaling period and the value of n being any integer. The modulation scheme illustrated by the first diagram will be referred to hereafter as "modulation scheme 1." The second diagram, in the center of FIG. 2, depicts the pair of points, C–D, representing the two phase values that the carrier can assume at signaling instant (n+1)T. The modulation scheme illustrated by the second diagram will be referred to as "modulation scheme 2." The third diagram, shown at right in the figure, depicts the pair of points representing the two phase values that the carrier can assume at signaling instant (n+2)T, these points being, of course, points A–B. Each of these points can be defined in the respective diagram by its rectangular coordinates, which represent the in-phase and quadrature components of the carrier. In the modulation scheme shown in FIG. 2, the in-phase and quadrature components of the various points are as follows:

A(+1, +1);
B(−1, −1);
C(−1, +1); and
D(+1, −1).

Points A, B, C and D represent the respective phase values of the carrier, namely, 45°, 225°, 135° and 315°.

The operation of the device shown in FIG. 1 will now be described. The data bits to be transmitted are sent over line 1 as rectangular pulses. Typically, a 1 bit will be represented by a rectangular pulse of amplitude +1 and a 0 bit by a rectangular pulse of amplitude −1. Clock 18 generates clock signals at the signaling rate 1/T. In practice, clock 18 supplies at each signaling instant a clock pulse that may be regarded as the equivalent of a 1 bit. The frequency of the clock signals from clock 18 is divided by two by the divider 19. Thus, divider 19 provides a clock pulse, which may be considered equivalent to a 1 bit, every other signaling instant. Divider 19 may be regarded as supplying a 0 bit at each even signaling instant and a 1 bit at each odd signaling instant.

At an even signaling instant, a 0 bit is applied via line 20 to Exclusive OR circuit 5. As a result, a data pulse present on line 1 is directly inputted via line 2 to filter 3, and passes unchanged through Exclusive OR 5 before being inputted via line 6 to filter 7. The data bit pulses inputted via lines 6 and 2 to filters 7 and 3 represent the in-phase and quadrature components, respectively, of the carrier to be transmitted. For example, if the data bit to be transmitted is a 1 bit, both the in-phase and quadrature components are equal to +1, which defines point A in the first diagram of FIG. 2. If the data bit to be transmitted is a 0, both components are equal to −1, which defines point B in the first diagram of FIG. 2. Points A and B represent carrier phase values of 45° and 225°, respectively.

At an odd signaling instant, a 1 bit is applied via line 20 to Exclusive OR circuit 5. Accordingly, a data pulse present on line 1 is directly inputted via line 2 to filter 3 and is inverted by Exclusive OR 5 before being inputted via line 6 to filter 7. In this case, if a 1 bit is to be transmitted, its in-phase and quadrature components will be respectively equal to −1 and +1, thereby defining point C in the second diagram of FIG. 2. If a 0 bit is to be transmitted, its in-phase and quadrature components will be respectively equal to +1 and −1, thereby defining point D in the second diagram of FIG. 2. Points C and D represent carrier phase values of 135° and 315°, respectively.

The operation of the downstream portion of the transmitter of FIG. 1, which includes filters 3 and 7 and summing device is that of a conventional BPSK transmitter. Reference may be made, for example, to section 10-1 of the above mentioned book titled *Data Transmission*. The rectangular pulses corresponding to the in-phase and quadrature components are respectively fed to lowpass filters 7 and 3 which convert them respectively into two pulses called baseband signal elements whose shape is more suitable for transmission. The signal elements thus obtained on lines 9 and 8 are used to modulate the amplitude of the in-phase carrier and the quadrature carrier, respectively, by means of modulators 11 and 10. The modulated signals are combined in summing device 16 and applied via line 17 to the input of the transmission channel.

The data receiver of the present invention will now be described with reference to FIG. 3, which illustrates a data receiver constructed in accordance with the invention and is suitable for use in a satellite transmission system employing the interleaved BPSK modulation technique described above. The signal from the transmission channel is applied via input line 30 to the input of a matched analog filter 31. The output from filter 31 is applied via line 32 to the input of a pair of demodulators 33 and 34 which, in this example, are balanced ring modulators. Such modulators are well-known components which are widely used in data transmission and will not be further described. A carrier and clock recovery device 35, to be described later, supplies a reference carrier which is directly fed via a line 36 to demodulator 33 and, through a 90° phase shifter 37 and a line 38, to demodulator 34. The outputs of demodulators 33 and 34 are directly connected to lowpass filters 39 and 40, respectively. In the example illustrated, filters 39 and 40 are passive analog filters of a conventional type that serve to eliminate undesirable modulation products and thermal noise. The output from filter 39 is applied via a line 41 to a (−) input of a summing device 42 and to a (+) input of a summing device 43. The output from filter 40 is applied via line 44 to a (+) input of summing device 42 and to another (+) input of summing device 43. In this example, devices 42 and 43 are conventional analog devices that use operational amplifiers. The outputs of summing devices 42 and 43 are respectively connected to the inputs of two limiters 45 and 46 which provide, for example, an up level or a down level in response to a positive signal or to a negative signal, respectively. The outputs of limiters 45 and 46 are respectively connected to an input of each of a pair of two-input AND gates 47 and 48. The clock signals provided by the clock and carrier recovery device 35 are applied directly via a line 49 to the second input of AND gate 47 and, through an inverter 50, to the second input of AND gate 48. The outputs of AND gates 47 and 48 are connected to the input of an OR gate 51, the output of which is representative of the received data.

Referring in greater detail to the clock and carrier recovery device 35, the output from filter 31 is inputted via a line 52 to a frequency multiplier 53 which multiplies the frequency by two. The multiplied output is applied via a line 54 to the input of a wide-band bandpass filter 55. The output of filter 55 is connected via line 56 to an input of a modulator 57, the output of which is connected to the input of a narrow band bandpass filter 58. The output of filter 58 is connected to the input of a frequency divider 59 which divides the frequency of the input signal by two to thus provide a reference carrier on line 36. The output of frequency multiplier 53 is additionally connected via a line 60 to the input of a narrow band bandpass filter 61, the output of which is connected to the input of a frequency divider 62 which divides the frequency of the input signal by two. Circuit 62 thus provides the reference clock signal that is applied to the other input of modulator 57 via line 63. This signal is additionally applied to AND gate 47 and to inverter 50 via line 49 as previously described. In the exemplary embodiment illustrated in FIG. 3, filter 55 is a wide band passive analog filter. Filters 58 and 61 are narrow band helical analog filters, modulator 57 is a balanced ring modulator, and frequency multiplier 53 and frequency dividers 59 and 62 are conventional analog components.

The operation of the device illustrated in FIG. 3 will now be described. The phase-modulated waveform received from the transmission channel via line 30 is first filtered in a conventional manner by matched filter 31 to eliminate the out of band noise and to limit the effects of intersymbol interference. The modulated and filtered waveform obtained at the output is a complex waveform which is dependent, in particular, on the signal element being used and the method of modulation itself. However, to simplify the description of the device of the present invention, the modulated and filtered waveform s(t) may be expressed as $$s(t) = \cos(\omega_c t + k\pi + \theta(t)) \quad (1)$$

where:

$\omega_c$ is the angular frequency of the carrier, $k\pi$ are the phase changes representative of the data, with k assuming the values 0 and 1, $\theta(t)$ is a term representing the modulation of $+\pi/2$ or $-\pi/2$ that is introduced by the interleaving technique.

The frequency of waveform s(t) is multiplied by two in frequency multiplier 53. This multiplier provides a waveform $s_1(t)$ which may be written as $$s_1(t) = \tfrac{1}{2} \cos[2\omega_c t + 2k\pi + 2\theta(t)] + \tfrac{1}{2} \quad (2)$$

In what follows, the DC component $+\tfrac{1}{2}$ which appears in relation (2) will be ignored since this component is eliminated by filters 55 and 61. For simplicity, the multiplication coefficient $\tfrac{1}{2}$ will also be ignored and waveform $s_1(t)$ will be written as $$s_1(t) = \cos[2\omega_c t + 2k\pi + 2\theta(t)] \quad (3)$$

In accordance with relation (3), waveform $s_1(t)$ includes the term $2\omega_c t$, which is representative of twice the carrier frequency, the term $2k\pi$, which may be removed from relation (3) since it is a multiple of $2\pi$, and the term $2\theta(t)$. The term $2\theta(t)$, introduced by the interleaving technique, represents a modulation of $\pm\pi$ of the carrier. Without going into mathematical development, it may be said that this additional modulation of $\pm\pi$ causes two rays at frequencies $(2\omega_c + \pi/T)$ and $(2\omega_c - \pi/T)$, where 1/T is the signaling frequency, to appear in the spectrum of waveform $s_1(t)$, which may consequently be written as $$s_1(t) = \cos\left[\left(2\omega_c + \frac{\pi}{T}\right)t\right] + \cos\left[\left(2\omega_c - \frac{\pi}{T}\right)t\right] \quad (4)$$

Figure 3:
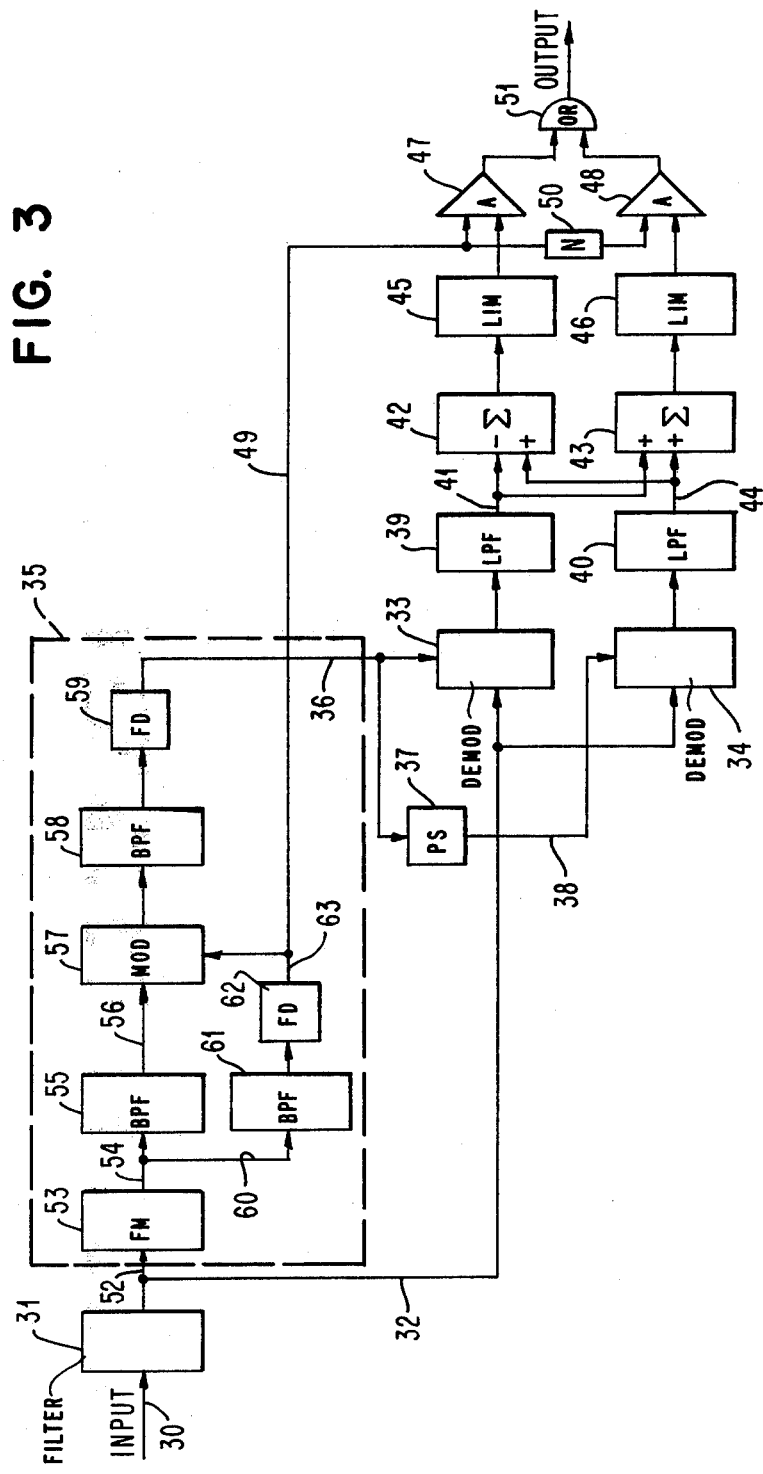
FIG. 3 is a block diagram of a data receiver constructed according to the present invention.

In the example illustrated in FIG. 3, frequency multiplier 53 performs two different functions: it is used both to eliminate the data, thereby allowing the unmodulated carrier to be recovered, and to detect the envelope of the received waveform to extract timing information therefrom. This is because, in this example, the carrier frequency (70 MHz) differs considerably from the signaling frequency (24.7 MHz), so that there is no risk of the two functions interfering with each other. It will be understood by those skilled in the art that, in other embodiments, provision could be made for an envelope detector separate from frequency multiplier 53.

As has just been stated, frequency multiplier 53 detects in a manner known per se the envelope of the received waveform. As is also known per se, the envelope of the received waveform includes a significant component at the signaling frequency 1/T. This component is extracted by the narrow band filter 61, which is centered at the signaling frequency. The signaling frequency provided by filter 61 is halved by frequency divider 62 which provides a clock signal $s_2(t)$ written as $$s_2(t) = \cos \pi/T \, t \quad (5)$$

Clock signal $s_2(t)$ at half the signaling frequency defines the interleaving rate.

This clock signal is used to modulate the signal $s_1(t)$ filtered by filter 55, this being done by means of modulator 57. Modulator 57 provides a signal $s_3(t)$:

$$s_3(t) = s_1(t) \times s_2(t) \quad (6)$$

which may also be written, in accordance with relations (4) and (5):

$$s_3(t) = \left[\left[\left(2\omega_c + \frac{\pi}{T}\right)t\right] + \cos\left[\left(2\omega_c - \frac{\pi}{T}\right)t\right]\right] \times \cos\frac{\pi}{T}t \quad (7)$$

Simplifying, relation (7) may be written $$s_3(t) = \cos 2\omega_c t + \cos\left[\left(2\omega_c + \frac{2\pi}{T}\right)t\right] \quad (8)$$

In relation (8), the term $\cos 2\omega_c t$ represents twice the carrier frequency.

The signal $s_3(t)$ provided by modulator 57 is fed to narrow band filter 58 which is centered at twice the carrier frequency and eliminates the component representing the term $$\cos\left[(2\omega_c t + \frac{2\pi}{T})t\right]$$

in relation (8). Accordingly, twice the carrier frequency is obtained at the output of filter 58.

The output from filter 58 is fed to frequency divider 59, which provides the carrier frequency on line 36. This carrier frequency is used as the in-phase reference carrier. This reference carrier, when its phase is shifted 90° by the 90° phase shifter 37, is used as quadrature reference carrier.

Before proceeding with the description of the operation of the device shown in FIG. 3, the data detection principle used by the receiver will be briefly discussed with respect to the diagrams of FIG. 2. At a given signaling instant, the received signal may be represented by a point Z in the diagrams of FIG. 2. (For simplicity, point Z has only been shown in the leftmost diagram). The x and y coordinates of this point are representative of the in-phase and quadrature components, respectively, of the received signal.

Assuming an ideal transmission, point Z, representative of the received signal, would coincide with point A, B, C or D representative of the transmitted signal. This does not happen in practice and it is necessary to determine from point Z which of points A-D has been transmitted. In the receiver of the present invention, when modulation scheme 1 is used, that is, at even signaling instants, the decision will be made that point A, representative, for example, of a 1 bit, has been transmitted if the sum x+y of the components of the received signal is positive, and that point B, representative, for example, of a 0 bit, has been transmitted if the sum x+y is negative. This amounts to using the detection threshold illustrated by the axis designated "Ref. 1" in the first diagram of FIG. 2. If modulation scheme 2 is used, that is, at odd signaling instants, the decision will be made that point C, representative, for example, of a 1 bit, has been transmitted if the difference, y−x, between the components of the received signal is positive, and that point D, representative of a 0 bit, has been transmitted if the difference y−x is negative. This amounts to using the detection threshold illustrated by the "Ref. 2" axis in the second diagram of FIG. 2. It is the clock signal provided by the clock and carrier recovery device 35 which determines whether the received signal is to be detected in relation to modulation scheme 1 or modulation scheme 2.

Referring again to FIG. 3, the received waveform filtered by filter 31 is demodulated by the in-phase and quadrature reference carriers using demodulators 33 and 34. The in-phase and quadrature components, x and y, respectively, of the received signal are obtained at the output of demodulators 33 and 34, and take the form of baseband signal elements which, ideally, would be identical to the baseband signal elements available at the output of filters 3 and 7 in the transmitter of FIG. 1. Then, the in-phase and quadrature components of the received signal are conventionally applied to filters 39 and 40, respectively. The filtered in-phase component is subtracted from the filtered quadrature component in summing device 42. The filtered in-phase and quadrature components are summed in summing device 43. Thus, the sum x+y of the in-phase and quadrature components and the difference, y−x, between them are obtained at the output of devices 43 and 42, respectively. Limiters 45 and 46 provide the sign of the difference between the components and that of their sum, respectively. Referring to the diagrams of FIG. 2, it will be seen that if the signaling instant is even and if the sum x+y of the components is positive, this will mean that point A has been transmitted. At an even signaling instant, the sign of the sum x+y is representative of the data. Similarly, at an odd signaling instant, the sign of the difference y−x is representative of the data. The clock signal supplied by device 35 determines whether the signaling instant is even or odd. When the clock signal present on line 49 is up, the sign of the difference y−x is gated to the output of the receiver through AND gate 47 and OR gate 51, whereas when the clock signal on line 49 is down, the sign of the sum X+y is gated to the output of the receiver through AND gate 48 and OR gate 51.

The self-synchronization feature of the receiver of the invention will now be described. It will be assumed that at a given signaling instant a 1 bit is sent by transmitting the carrier whose components are x=+1, y=+1, that is, by transmitting point A. In the absence of synchronization error, the clock signal present on line 49 will be down and the sign of the sum x+y, i.e., a positive sign, will be gated to the output of the receiver as representing a 1 bit. If a synchronization error occurs, the clock signal on line 49 will be up, activating AND gate 48 and gating the sign of the difference y−x to the output of the receiver. However, a synchronization error means that an error equal to π alters the clock signal on line 63, which error results in the carrier present on line 36 exhibiting an error equal to π/2. The carrier will rotate by π/2 and the components of the point received will be x=−1 and y=+1. Then, y=x will be equal to +2 and the sign of y−x will be positive. The output of the receiver will see a positive sign and detect a 1 bit. Thus, a clock signal error will have no effects on data detection. That means that if the receiver is not synchronized with the transmitter, no data detection errors will occur. A correct operation of the receiver does not require the receiver to be synchronized with the transmitter. The receiver is, therefore, said to be self-synchronized.

While the invention has been particularly shown and described with reference to a preferred embodiment thereof, it will be understood by those skilled in the art that numerous changes in form and detail may be made therein without departing from the spirit and scope of the invention.

What is claimed is:

1. In a data transmission system employing an interleaved BPSK modulation technique wherein each bit to be transmitted at an even signaling instant is made to correspond to a selected one of a first pair of points differing in phase by 180° in the space diagram illustrating the state of the carrier being transmitted, and wherein each bit to be transmitted at an odd signaling instant is made to correspond to a selected one of a second pair of points differing in phase by 180°, and with the said first and second pairs of points being 90° apart in phase, a receiver characterized in that it includes:

input means adapted for receiving the signal from the transmission channel, means responsive to the received signal for deriving a reference carrier from said received signal and providing said reference carrier and said reference carrier shifted by 90°, first demodulation means responsive to said received signal and said reference carrier for demodulating said received signal and providing the in-phase component of said received signal, second demodulation means responsive to said received signal and said reference carrier shifted by 90° and providing the quadrature component of said received signal, first summing means responsive to said in-phase and quadrature components for providing the difference between said in-phase and quadrature components, second summing means responsive to said in-phase and quadrature components for providing the sum of said in-phase and quadrature components, first detection means responsive to the output from said first summing means for providing the sign of said difference between said components, second detection means responsive to the output from said second summing means for providing the sign of said sum of said components, means responsive to said received signal for deriving from the received signal a clock signal at half the signaling rate, and gating means responsive to said clock signal and the outputs of said first and second detecting means for selectively gating the sign of said sum of said components to the output of the receiver under control of said clock signal.

2. A receiver according to claim 1, characterized in that said means for deriving said clock signal includes:

means for detecting the envelope of the received signal, first narrow band filter means responsive to the detected envelope for deriving a signal at the signaling frequency from said detected envelope, and means responsive to the narrow band filter means output for dividing the frequency of said signal at the signaling frequency by two, thereby providing said clock signal at half said signaling rate, and in that said means for deriving said reference carrier includes:

means responsive to said received signal for doubling the frequency of said received signal, modulation means responsive to the frequency doubled received signal for modulating said frequency doubled signal, by means of said clock signal at half said signaling rate, second narrow band filter means responsive to the modulated received signal for deriving a signal at twice the carrier frequency from the signal provided by said modulation means, and means responsive to the output from said second narrow band filter means for dividing the frequency of said signal at twice the carrier frequency to provide said reference carrier.

3. A receiver according to claim 1, characterized in that said means for deriving said clock signal includes:

means responsive to said received signal for doubling the frequency of the said received signal, first narrow band filter means responsive to the frequency doubled received signal for deriving a signal at the signaling frequency from said frequency doubled signal, means responsive to said first narrow band filter means output for dividing the frequency of said signal at the signaling frequency by two, thereby providing said clock signal at half the signaling rate, and in that said means for deriving said reference carrier include:

modulation means responsive to the frequency doubled received signal and the said clock signal at half the signaling rate for modulating said frequency doubled received signal by means of said clock signal at half the signaling rate, second narrow band filter means responsive to the modulation means output for deriving a signal at twice the carrier frequency from the modulation means output signal, and means responsive to the output from said second narrow band filter means for dividing the frequency of said signal at twice the carrier frequency by two, and thus providing said reference carrier.

* * * * *